United States Patent [19]

Jaw

[11] Patent Number: 5,083,581
[45] Date of Patent: Jan. 28, 1992

[54] NOZZLE FOR INFLATABLE OBJECTS

[76] Inventor: Horng-Chang Jaw, 6th Fl. Alley 29, Lane 372, Sec. 5, Chunghsiao E. Rd., Taipei, Taiwan

[21] Appl. No.: 714,014

[22] Filed: Jun. 12, 1991

Related U.S. Application Data

[63] Continuation-in-part of Ser. No. 253,225, Oct. 4, 1988, Pat. No. 4,823,831.

[51] Int. Cl.⁵ .................... F16K 15/18; F16K 15/20
[52] U.S. Cl. .................................. 137/223; 137/232; 137/855; 446/224
[58] Field of Search ............... 137/232, 233, 234, 855, 137/614.2, 614.21, 223; 446/224

[56] References Cited

U.S. PATENT DOCUMENTS 2,839,073  6/1958  Marsh .................................. 137/232

FOREIGN PATENT DOCUMENTS 797059  6/1958  United Kingdom ............... 137/232
941239  11/1963  United Kingdom ............... 137/223
947559  1/1964  United Kingdom ............... 137/223

Primary Examiner—Arnold Rosenthal
Attorney, Agent, or Firm—Bacon & Thomas

[57] ABSTRACT

A nozzle for inflatable objects, made of a plastic material, including a nozzle seat adapted to engage with the inflatable object, a first annular wall extending from the nozzle seat, a relatively thin ring portion formed at top end of the first annular wall, a second annular wall extending from the ring portion to define an air inlet, a plug for blocking air inlet, a plug arm extending from second annular wall and connecting the plug with second annular wall, a plug extension formed with a projection and extended from the plug at a position remote from plug arm, a tab formed with a hole and located at a side of air inlet opposite plug arm, and a one-way membrane extending from first annular wall, which during inflation allows air to blow through air inlet into the inflatable object, whereby after inflation, the plug is fitted into air inlet and the nozzle is retracted into the inflatable object with first bent portion bent downward, while when deflating, the plug is drawn out of air inlet and the nozzle is further retracted into the inflatable object with second bent portion bent downward to open the one-way membrane.

3 Claims, 3 Drawing Sheets

NOZZLE FOR INFLATABLE OBJECTS

CROSS-REFERENCE TO RELATED APPLICATION

This application is a continuation-in-part of application Ser. No. 253,225, filed on Oct. 4, 1988, now with U.S. Pat. No. 4,823,831.

BACKGROUND OF THE INVENTION

The present invention relates to a nozzle and more particularly to a nozzle for inflatable objects.

U.S. Pat. No. 4,823,831 discloses a nozzle for inflatable objects, including a nozzle seat which is subject to engage with the inflatable object in such a manner that it is normally retracted in the inflatable object but also being extendable from the surface of the inflatable object when being pulled out; and annular wall extended from the nozzle seat which defines an air inlet; a plug for insertion into the air inlet; a plug arm extended from the annular wall and connecting the plug with the nozzle seat; a plug extension extended from the plug at a position remote from the plug arm and having two holes; a tie at a side of the air inlet opposite the plug arm being passable through the two holes on the plug extension; and a piece of one-way membrane extended from a lower face of the nozzle seat which during inflation allows air to blow in through the air inlet but which blocks air from flowing out of the air inlet when the nozzle seat is protruded from the surface of the inflatable object.

Such nozzle can be easily and conveniently used and a quite satisfying effect is achieved. However, some disadvantages still exist in such nozzle. For example, generally, when using the inflatable object, the nozzle is retracted into the inflatable object without protruding beyond the surface thereof. After the nozzle is retracted, the one-way membrane is detached from the air inlet. Although the tie and plug extension can be associated to securely prevent the plug from slipping away, in case the tie and plug extension are not fastened due to negligence, the plug will be apt to separate from the air inlet due to external collision, making the inflatable object deflated to cause danger. Moreover, the tie has a knob and is serrated and the plug extension has two holes so that the tie can pass through the two holes and firmly associate with the plug extension so as to more securely fasten the plug in the air inlet. However, it is troublesome to pass through the tie through the two holes of the plug extension. This often makes the user feel inconvenient.

It is therefore tried by the applicant to develop a more practical and convenient nozzle for inflatable objects to solve the above problems.

SUMMARY OF THE INVENTION

It is an object of this invention to provide a double-safety nozzle for inflatable objects including a nozzle seat, a first annular wall extending from the nozzle seat, a relative thin ring portion formed at top end of the first annular wall, a second annular wall extending from the ring portion to define an air inlet, a plug blocking the air inlet, a plug arm extending from the second annular wall and connecting the plug with the second annular wall, a plug extension formed with a projection and extended from the plug at a position remote from the plug arm, a tab formed with a hole and located at a side of the air inlet opposite the plug arm for optional engagement with the plug extension, and a piece of one-way membrane extending from the first annular wall for sealing the air inlet.

The conjunction between the nozzle seat and first annular wall serves as a first bent portion. The ring portion between the first annular wall and second annular wall is relatively thin to serve as a second bent portion. The diameter of the second bent portion, i.e., the ring portion 103 is smaller than that of the first bent portion, and the thickness of the second bent portion is larger than that of the first bent portion, and the slope of the first annular wall 102 is larger than that of the wall of the nozzle seat 101 so that when a downward force is exerted on the nozzle 100, the first bent portion will be first bent downward rather than the second bent portion. While when a larger downward force is exerted on the nozzle 100, the second bent portion 103 will be further bent downward. Therefore, after the inflation is completed, the plug is fitted into the air inlet to block the same. In addition, the plug extension is passed through the hole of the tab with the projection abutting against the tab. Then, at a first retraction stage, the nozzle is retracted into the inflatable object with the first bent portion bent downward. At this time, the nozzle is substantially on the same level as the surface of the inflatable object and the one-way membrane remains to seal the air inlet. Even the tab and plug extension are not associated, the one-way membrane still abuts against the lower end of the air inlet to provide double-safety sealing effect for the inflatable object.

While when the inflatable object is to be deflated the nozzle 100 is further retracted into the inflatable object at a second retraction stage so that the second bent portion, i.e., the ring portion is bent downward and the one-way membrane is forced away from the air inlet, permitting the air in the inflatable object to rapidly escape outside.

The present invention can be best understood through the following description and accompanying drawings wherein:

DETAILED DESCRIPTION OF THE PREFERRED EMBODIMENT

Figure 1:
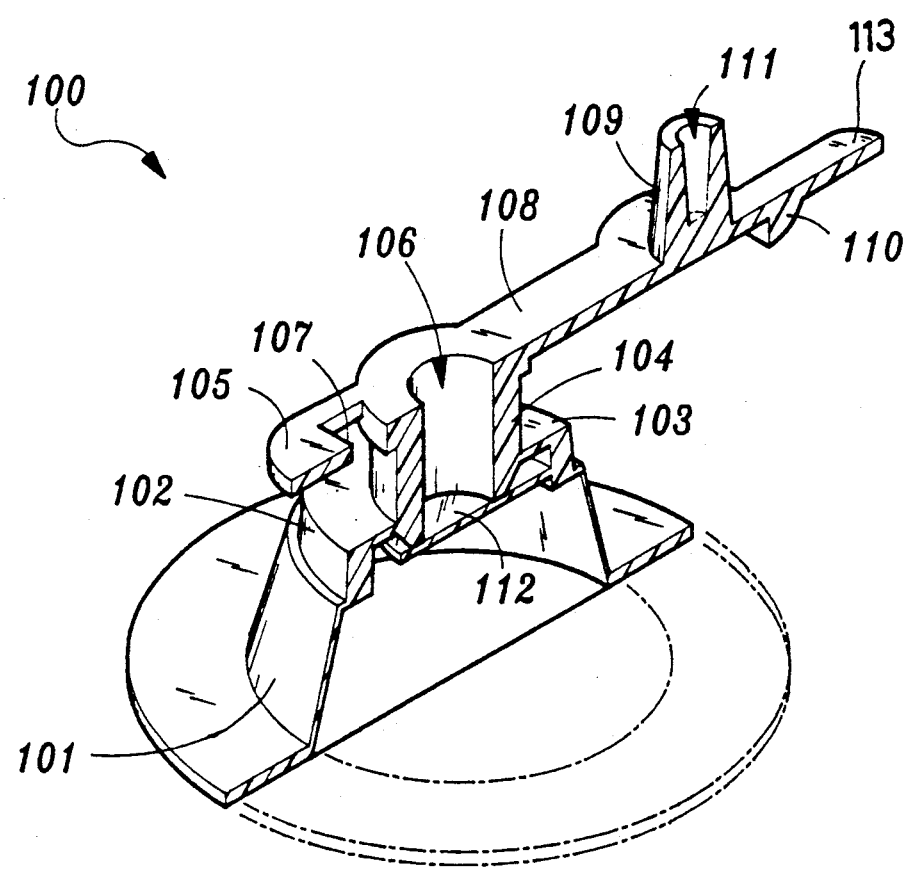
FIG. 1 is a perspective partially sectional view of this invention.

Please refer to FIG. 1. The nozzle 100 of this invention includes a trumpet-shaped nozzle seat 101 suitable to engage with the inflatable object, a first annular wall 102 extending from the nozzle seat 101, a relatively thin ring portion 103 formed at top end of the first annular wall 102, a second annular wall 104 extending from the ring portion 103 to define an air inlet 106, a plug 109 with a substantially conic well 111 for blocking the air inlet 106, a plug arm 108 extending from the second annular wall 104 and connecting the plug 109 with the second annular wall 104, a plug extension 113 formed with a projection 110 and extended from the plug 109 at a position remote from the plug arm 108, a tab 105 formed with a hole 107 and located at a side of the air inlet opposite the plug arm 108 for optional engagement with the plug extension 113, and a piece of one-way membrane 112 extending from the first annular wall 102 for sealing the air inlet 106.

Figure 4:
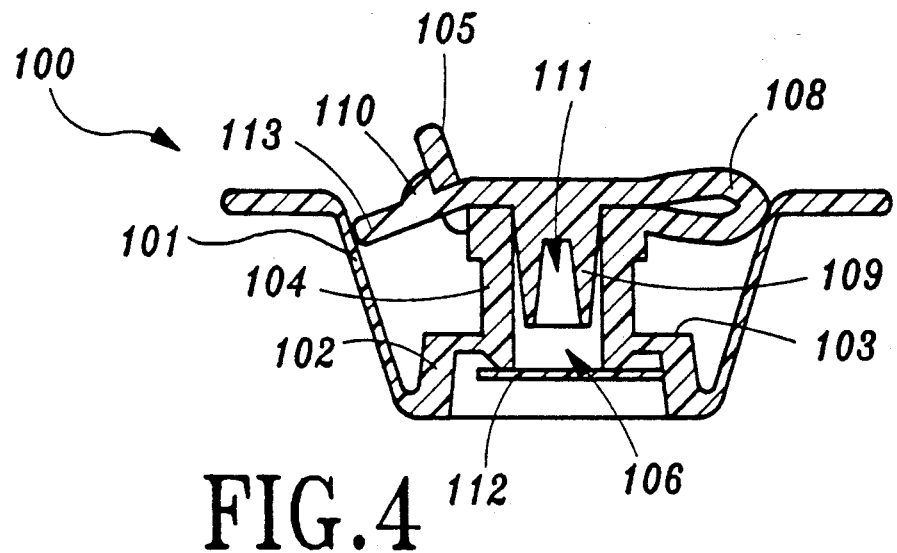
FIG. 4 is a sectional view according to FIG. 2, wherein the nozzle is retracted into the inflatable object with the first bent portion bent downward.
Figure 5:
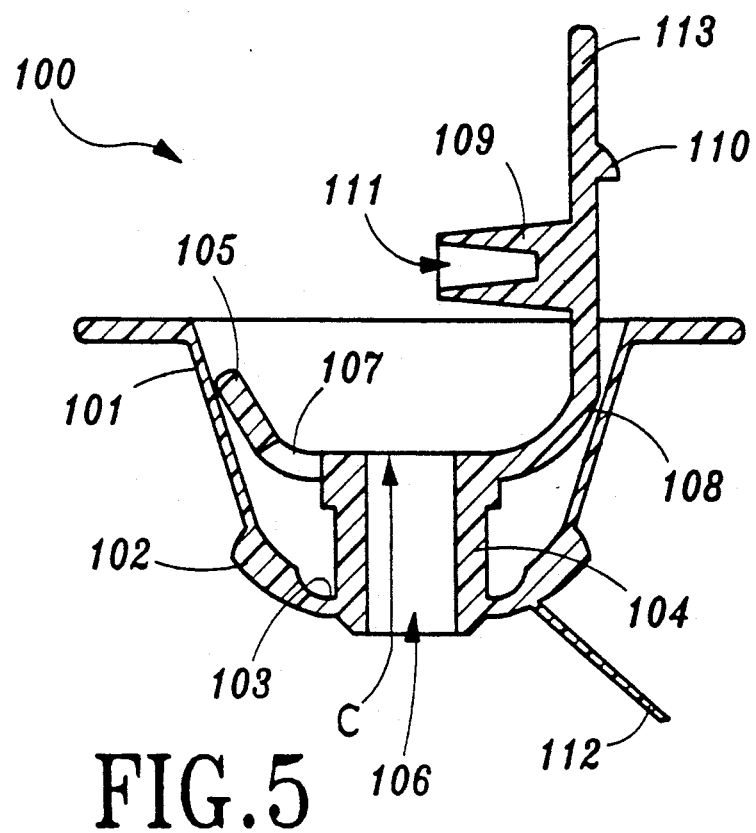
FIG. 5 is a sectional view according to FIG. 2 showing the nozzle in a deflation state, wherein the plug is drawn out of the air inlet and the nozzle is further retracted into the inflatable object with the second bent portion bent downward to force the one-way membrane away from the air inlet during deflation.

The conjunction between the nozzle seat 101 and first annular wall 102 serves as a first bent portion whereby the nozzle 100 can be pressed down to the same level as the surface of an inflatable object, as shown in FIG. 4. Because the nozzle 100 is made of soft plastic material, therefore it can be easily bent. The ring portion 103 between the first annular wall 102 and second annular wall 104 is relatively thin so that the ring portion 103 serves as a second bent portion.

The diameter of the second bent portion, i.e., the ring portion 103 is smaller than that of the first bent portion, and the thickness of the second bent portion is larger than that of the first bent portion, and the slope of the first annular wall 102 is larger then that of the wall of the nozzle seat 101 so that when a downward force is exerted on the nozzle 100, the first bent portion will be first bent downward rather than the second bent portion. While when a larger downward force is exerted on the nozzle 100, the second bent portion 103 will be further bent downward.

Figure 2:
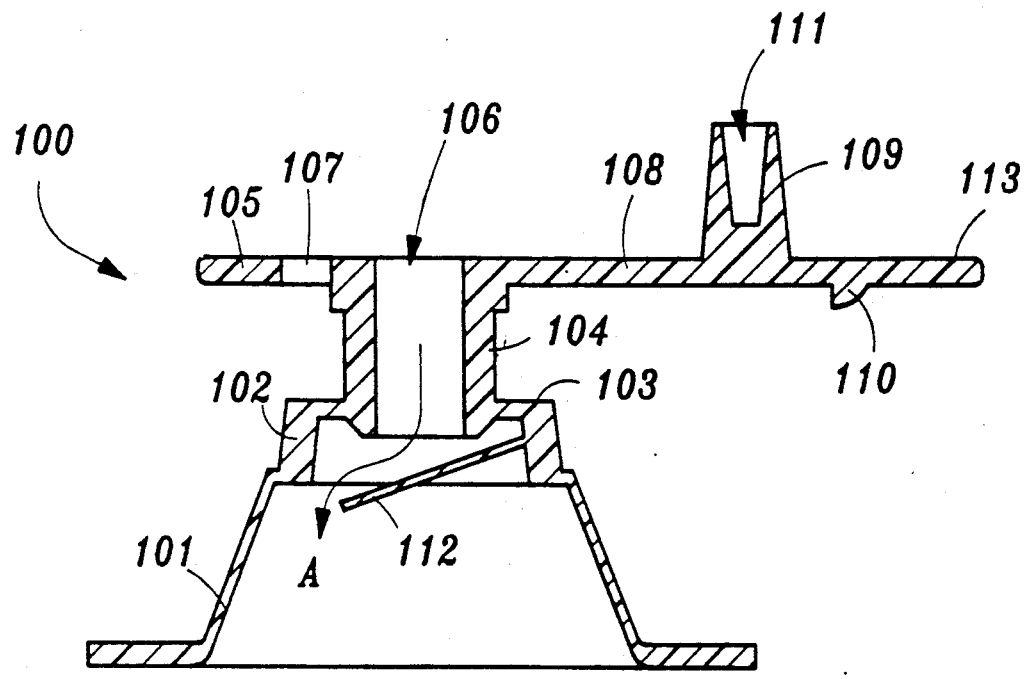
FIG. 2 is a sectional view, showing the nozzle is an inflating state.
Figure 3:
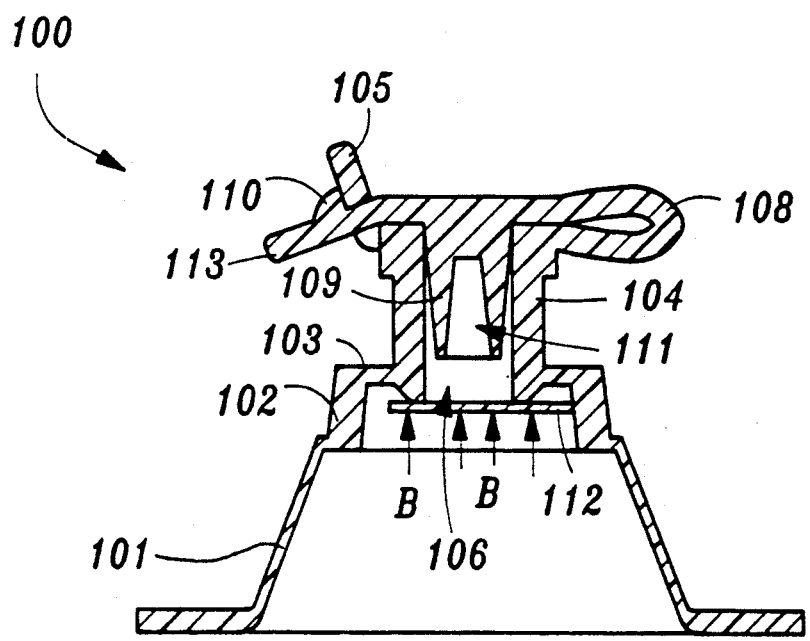
FIG. 3 is a sectional view according to FIG. 2, wherein the plug is inserted into the air inlet.

Referring to FIGS. 2, 3, 4 and 5, when inflating, the plug 109 is opened and the one-way membrane 112 is forced downward by in-coming air indicated by arrow A in FIG. 2. After the inflation is completed, the air tends to rush out and forces the membrane 112 upward to seal the air inlet 106 as indicated by arrow B in FIG. 3. Then the plug 109 is fitted into the air inlet 106 to block the same. In addition, the plug extension 113 is passed through the hole 107 of the tab 105 with the projection 110 abutting against the tab 105. Then, at a first retraction stage, the nozzle 100 can be retracted into the inflatable object with the first bent portion bent downward. At this time the one-way membrane 112 remains under the air inlet 106 to seal the same, and the nozzle 100 is substantially on the same level as the surface of the inflatable object. Therefore, a double-safety sealing effect is achieved. While in case the inflatable object is to be deflated, it is not needed to pull the nozzle 100 upward. Substitutively, the tab 105 and plug extension 113 are detached and the plug 109 is drawn out of the air inlet 106. Then, at a second retraction stage, the nozzle 100 is further retracted into the inflatable object with the second bent portion, i.e., the ring portion 103 bent downward. At this time, the one-way membrane 112 is forced away from the air inlet 106 so that the air in the inflatable object can rapidly escape outside the inflatable object as indicated by arrow C in FIG. 5.

As indicated, the structure herein may be variously embodied. Recognizing various modifications will be apparent, the scope hereof shall be deemed to be defined by the claims as set forth below.

What is claimed is:

1. A nozzle for an inflatable object, comprising:
    a nozzle seat retractable into said inflatable object and extendable from a surface thereof;
    a first annular wall extending from said nozzle seat;
    a relatively thin ring portion formed at top end of said first annular wall;
    a second annular wall extending from said ring portion to define an air inlet;
    a plug adapted to fit into said air inlet and block the same;
    a plug arm extending from said second annular wall and connecting said plug with said second annular wall; and
    a piece of one-way membrane extending from said first annular wall and allowing air to flow in through said air inlet during inflation but blocking air from flowing out from said air inlet when the inflation is finished, whereby when the inflation is completed, said plug is inserted into said air inlet and said nozzle is retracted into the inflatable object with said first bent portion bent downward and said one-way membrane remaining under said air inlet to seal the same, while when deflating, said plug is drawn out of said air inlet with said nozzle further retracted into the inflatable object and with said second bent portion, i.e., said thin ring portion bent downward to force said one-way membrane away from said air inlet.

2. A nozzle as claimed in claim 1, wherein said nozzle is made of plastic material such as polyvinyl chloride.

3. A nozzle as claimed in claim 1, further comprising a plug extension extended from said plug at a position remote from said plug arm, said plug extension having a projection, and a tab at a side of said air inlet opposite said plug arm, said tab having a hole, whereby after the inflation is completed, said plug is inserted into said air inlet and said plug extension is passed through said hole of said tab with said projection of said plug extension abutting against said tab.

* * * * *